INVENTORS
DANIEL J. DONAHUE &
AUSTIN E. HARDY
BY L. Greenspan
ATTORNEY

United States Patent Office 3,354,341
Patented Nov. 21, 1967

3,354,341
CATHODE RAY TUBE SCREEN WITH COLOR
AREAS OF DIFFERING CONTOURS
Daniel J. Donahue, Somerville, N.J., and Austin E. Hardy, Lancaster, Pa., assignors to Radio Corporation of America, a corporation of Delaware
Original application Oct. 9, 1961, Ser. No. 143,927. Divided and this application Mar. 21, 1966, Ser. No. 536,097
4 Claims. (Cl. 313—92)

ABSTRACT OF THE DISCLOSURE

A luminescent screen for a cathode ray tube consisting essentially of a multiplicity of first elemental phosphor areas, each having a similar closed contour, and second phosphor areas filling all of the screen surface not occupied by the first elemental phosphor areas. In a preferred form, the first areas are comprised of arrays of green-emitting and blue-emitting phosphor dots and the second phosphor areas are red-emitting.

---

This is a division of application Ser. No. 143,927 filed Oct. 9, 1961.

This invention relates to improvements in color-phosphor screens and has special reference to improvements in the so-called direct photographic method of laying down a mosaic of color-phosphors on a glass substrate for use as the electron-sensitive screen of a color-kinescope or the like.

As presently practiced the direct photographic method of making color-phosphor screens of various dot-like and line-like mosaic varieties consists essentially of the following steps:

(i) Applying to the target surface of a glass screen-plate a slurry layer comprising phosphor particles of one color contained in a photosensitized organic gel, e.g., dichromated polyvinyl alcohol;
(ii) Drying the slurry layer;
(iii) Exposing said phosphor-containing photosensitized layer to actinic rays through the apertures in a suitable optical stencil or mask whereby photographically to record the pattern of dots (or lines) of said one color upon said target surface;
(iv) Washing the plate to develop the photograph thereon;
(v) Drying the phosphor-containing photograph;
(vi) Repeating the preceding steps for each of the other colors, with the source of actinic rays disposed at an appropriately different position with respect to said stencil; and, finally
(vii) Baking-out the screen to volatilize and remove the light-hardened polyvinyl alcohol or other organic gel therefrom.

In the direct photographic method, above described, the body color of the phosphor in any given slurry layer is a major factor in determining the exposure time required to record the pattern of the stencil in the photosensitized gel of that layer. In the manufacture of present day color-screens, the slurry layer that contains the green-emitting phosphor (e.g., zinc cadmium sulfide) and the one that contains the blue-emitting phosphor (e.g., silver activated zinc sulfide) are of light body colors, and each requires an exposure time of less than 10 minutes (actually about 8 minutes). On the other hand, the slurry layer that contains the red-emitting phosphor (e.g., silver activated zinc cadmium sulfide) has a dark body color, and requires an exposure time of more than 20 minutes (actually 24 minutes). The long exposure time required to form the red-emitting elemental areas of the mosaic is due to its dark body color and is a significant factor in determining the cost of present day color-kinescopes.

Accordingly, it is an object of the present invention to cut costs by effecting a substantial reduction in exposure time.

The foregoing and related objects are achieved in accordance with the invention by (i) laying down those elementary areas of the mosaic that are allotted to the color-phosphors of the relatively light body-colors in any usual way (e.g., with the stencil and a point source of light disposed on the target side of the glass screen-plate), (ii) subjecting said elementary areas of the mosaic to the action of a thermally decomposable organic dye to render them temporarily opaque to actinic rays, (iii) covering said target surface and the opaque phosphor-containing areas thereon with a photosensitized organic gel containing phospor particles of the relatively dark body-color, then (iv) flood-lighting or otherwise exposing the entire obverse surface of the screen-plate to harden those photosensitized areas of the gel which are not shielded from said rays by said temporarily opaque elemental areas of said mosaic. The screen-plate may then be washed to develop the resulting photograph by removing the unhardened areas of the gel, and thereafter baked to remove both the light-hardened gel and the thermally decomposable organic dye.

If the pre-formed elemental areas of the mosaic are inherently sufficiently opaque to the actinic rays employed in forming the dark body color phosphor areas, the dyeing step may be omitted. Thus, said areas need not be dyed where the concentration of the light body-color phosphor particles is sufficient to render them opaque, or when the gel in which said particles are contained has been "tanned" by prolonged exposure. In using the pre-formed elemental areas of the mosaic as the stencil for laying down the phosphor of the dark body-color, the exposure time of the latter has, in practice, been reduced to a value even lower than that required in laying down the elementary areas of the phosphors of the light body-colors.

The invention is described in greater detail in connection with the accompanying single sheet of drawings, wherein.

Figure 1:
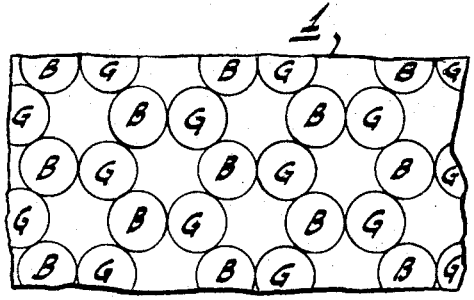
FIG. 1 is a partial plan view of a tri-color phosphor mosaic in that stage of its manufacture whereat the elemental areas of the mosaic which are allotted to two of the three colors have already been laid down in the form of circular dots B (blue) and G (green) on the target surface of a glass screen-plate.

In the accompanying drawing, the invention is illustrated as applied to the manufacture of a 3-color phosphor mosaic made up of a multiplicity (usually 300,000 or more) of "triads" (i.e., groups of three) of blue (B), green (G), and red (R) color-phosphor dots. FIG. 1 shows such a screen in that stage of its manufacture whereat the dot-like elementary areas of the mosaic that are alloted to the color-phosphors of the two light body-colors have already been laid down in the form of non-porous yet translucent circular dots G (green) and B (blue) on the inner or target surface of a glass screen-plate 1. At this stage the phosphor particles of which the dots G and B are respectively made up are contained in a light-hardened photo-sensitized organic gel such for example, as polyvinyl alcohol. The phosphor particles may be added to the gel either before or after the separate patterns (G and B) have been formed. In the latter case, if the gel has already been hardened, it may be rendered tacky, e.g., by treating it with sodium hydroxide prior to "dusting on" the phosphor particles of the appropriate color.

Figure 2:
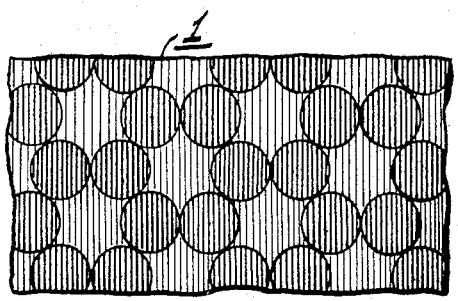
FIG. 2 is a view similar to FIG. 1 but with the drawing shaded to indicate that the screen-plate and the phosphor dots thereon have been treated with an opaque dye.
Figure 3:
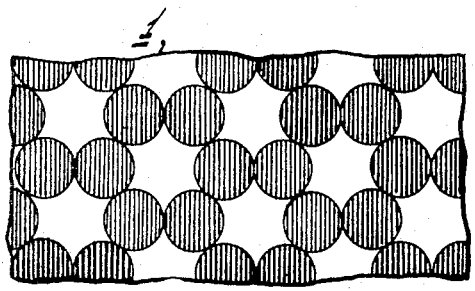
FIG. 3 is a view similar to FIG. 1 but with the dye removed from the bare parts of the glass and confined to the phosphor dots.

To permit the screen-plate and its phosphor dots G and B to be used as an optical stencil in laying down the third (dark body-color) phosphor it is desirable to render the translucent gel in said dots as opaque as possible to the actinic rays employed in forming the elementary areas or dots of the third color. One way of accomplishing this is by subjecting the target surface of the screen-plate, and hence the gel in the green and blue phosphor dots, to the action of a solution containing a thermally decomposable organic dye, permitting the dye to dry and thereafter washing the plate to remove the dye from the bare glass which lies between the now opaque dots G and B. One dye especially suitable for this purpose is "Congo red," used in a solution of 2 grams of dye dissolved in 100 milliliters of demineralized water. Although other dyes (e.g., Pontacyl Rubine R and Pontamine Fast Red 8 BLX and Chromacyl Pink–BN) may be used for the purpose, "Congo red" is preferred because (a) it is highly adsorbed by the light-hardened polyvinyl alcohol of the phosphor dots G and B, and (b) it increases the opacity of the dots by a factor of from 5 to 10. The dye solution may be applied to the target surface of the plate in the form of a spray, or by rinsing. FIG. 2 shows the target surface of the screen-plate covered all over with the dye, the screen-plate is now in a condition to have the ing washed, i.e., with the dye (indicated by the hatching) removed from the bare glass between the dots B and G.

The dots B and G which contain the phosphors of the lighter body-colors having been rendered opaque by the dye, the screen-plate is now in a condition to have the third phosphor applied. To this end, the target surface of the screen-plate, and the preformed dots B and G thereon, are first covered with a photosensitized slurry layer 3 (FIG. 4) containing the particles of the dark body-color phosphor. One satisfactory slurry formulation is:

Phosphor=275 gms. red phosphor (silver activated zinc cadmium sulfide)
Organic gel=550 gms. polyvinyl alcohol solution (10% p.v.a. by weight)
Humectant=22 gms. ethylene glycol
Photosensitizer=55 gms. ammonium dichromate
Carrier=375 gms. demineralized water The humectant in this otherwise conventional slurry serves to re-wet and to swell the organic gel in the previously developed phosphor-containing elementary areas B and G of the mosaic, and thus minimized intermingling of the color-phosphor in the last applied slurry layer with the color phosphor in either of the previously developed elementary areas B, G.

Figure 4:
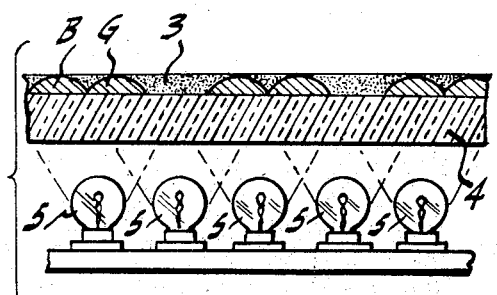
FIG. 4 is a sectional view of the screen of FIG. 3 after being coated over its target surface with a phosphor slurry of the third color, and with the entire obverse surface of the screen-plate exposed to actinic rays whereby to harden those areas of the slurry which are not shielded from said rays by the temporarily opaque elemental areas of the mosaic.

When the slurry layer 3, FIG. 4, has been dried, preferably at room temperature, the obverse surface 4 of the screen-plate is presented to a source of actinic rays, exemplified by a bank of ultra-violet emitting fluorescent lamps 5, to harden those photo-sensitized areas of the gel which are not shielded from said rays by the temporarily opaque areas G and B of the mosaic. The fact that the light rays may be diffused in passing through the glass, or scattered by some imperfection in the glass, it is of no significance, because the gel in the first applied dots G and B has already been hardened by the rays employed in forming said dots.

In one practical embodiment of the invention, involving the manufacture of a 3-color, 21″ screen, wherein a band of six General Electric Co. BL360 lamps were disposed about 6 inches in front of the screen-plate, the exposure time for the phosphor containing gel of the preceding formula was 7 minutes. Upon developing the resulting photograph in the usual way, i.e., by spraying it with water to remove the unhardened phosphor-containing gel, the unique mosaic pattern of phosphor dots G, B, R, shown in FIG. 5, was obtained.

Figure 5:
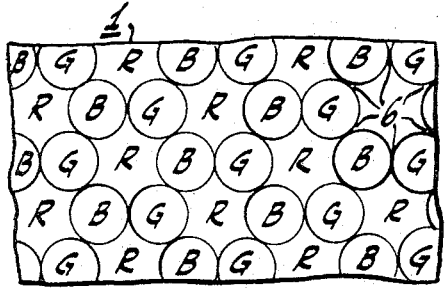
FIG. 5 is a partial plan view of a tri-color phosphor dot-screen made in accordance with the method of the invention.
Figure 6:
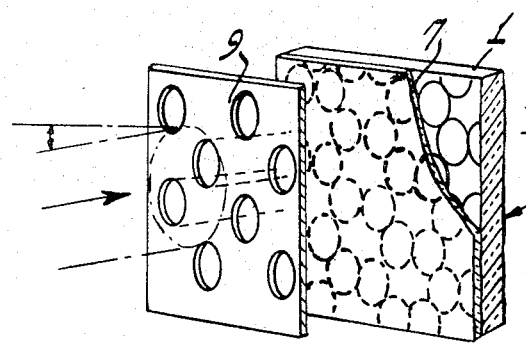
FIG. 6 is a view in perspective showing the dot-like mosaic of FIG. 5 provided with a specular metal layer and used as the screen element of a target assembly of a color-kinescope of the "masked target" variety.

The pattern of the 3-color phosphor-dot screen shown in FIG. 5 is similar in two respects with the pattern employed in present-day color-kinescopes, that is to say (a) the dots are tangent to each other and (b) are arranged in "hexagonal" pattern, i.e., each dot is surrounded by six other dots, alternate ones of said other dots being of a second color and the intermediate ones of said other dots being of a third color. The pattern of this screen, however, differs from that of a conventional 3-color dot-screen in that here the dots (r) of the dark-body color, instead of being circular in outline, have six ceretoid cusps 6 which cover the otherwise bare glass between the dots of the other two color-phosphors (G and B). As a consequence, when, as is usually the case, the target surface of the screen is provided with an electron-transparent specular metal layer 7 (FIG. 6) no ambient light can reach the specular metal through the glass and the screen is thus free from the optically disturbing effect known as "aluminum shine," which shine is characteristic of the phosphor screens of the prior art wherein all of the dots are circular.

As previously mentioned, the dye normally employed in the practice of the invention is of a kind that decomposes when subjected to heat. It is thus removed, with the organic gel, when the screen is "baked-out," subsequent to being aluminized in the usual way. As indicated by the presence of an apertured mask 9 in FIG. 6, the dot-screen of the invention, as herein described, may be used as the screen element of a color-kinescope of the well-known masked target variety.

What is claimed is:

1. A screen-plate having a three-color phosphor screen of the mosaic variety on the target surface thereof, the phosphor-containing elemental areas of which said mosaic is comprised consisting essentially of a multiplicity of groups of three color-phosphor dots of respectively different color response characteristics arranged in a hexagonal pattern wherein each dot is surrounded by six other dots, alternate ones of said other dots being of a first color response characteristic and intermediate ones of said other dots being of a second color response characteristic, two dots of each of said groups being of circular contour disposed adjacent to each other and the color-phosphor which is allotted to the third dot of each group filling all of those areas of said mosaic which are not occupied by said circular dots.

2. A multi-color phosphor screen consisting essentially of a multiplicity of groups of at least two different elemental phosphor areas of respectively different color response characteristics, all of the elemental phosphor areas except one of each of said groups having a definite similar closed contour, and said one elemental phosphor area filling all of the target surface which is not occupied by said other elemental phosphor areas and joining the one phosphor areas of adjacent groups of said screen.

3. A cathode ray tube comprising an evacuated envelope, means for producing an electron beam in said envelope, and a screen within said envelope adapted to be excited by said electron beam, said screen consisting essentially of a multiplicity of groups of three different elemental phosphor areas, the first and second elemental phosphor areas of each of said groups being of similar closed contour disposed adjacent to each other and the third elemental phosphor area differing in contour from the contours of said first and second elemental phosphor areas and filling all of the target surface which is not occupied by said first and second elemental phosphor areas and joining the third elemental phosphor areas of adjacent groups of said screen.

4. A cathode-ray tube for displaying colored images by means of a display screen comprising a transparent support on which is deposited three substances which, on excitation by electrons, luminesce and emit light of three different colors, two of the said substances being disposed on the support in a pattern of alternate circular dots on the vertices of regular hexagons adjoining one another in honeycomb relationship and the third substance covers the remainder of the support between the dots.

References Cited
UNITED STATES PATENTS

| | | | |
|---|---|---|---|
| 2,962,623 | 11/1960 | Beintema | 313—92 |
| 3,067,349 | 12/1962 | Kasperowicz et al. | 313—92 |
| 3,109,116 | 10/1963 | Epstein | 313—92 |
| 3,226,246 | 12/1965 | Vermeulen et al. | 117—33.5 |

JAMES W. LAWRENCE, *Primary Examiner.*

ROBERT SEGAL, *Examiner.*